Dec. 28, 1937.   R. E. GAY   2,103,900
AUTOMOBILE SNOW PLOW
Filed Dec. 3, 1935   2 Sheets-Sheet 1
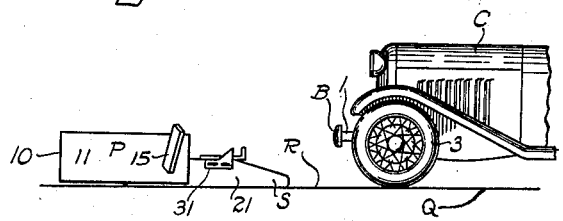
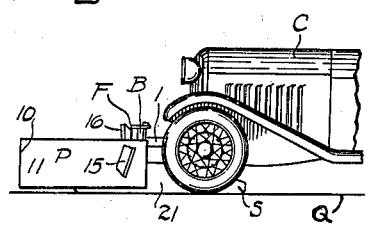
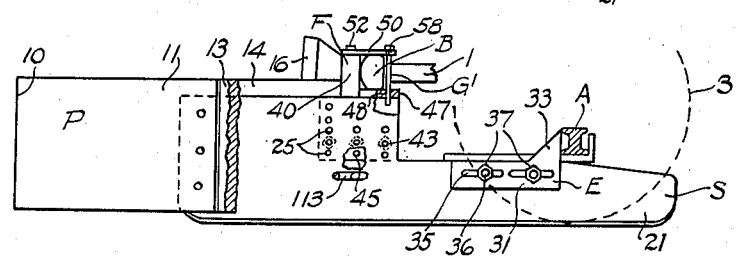
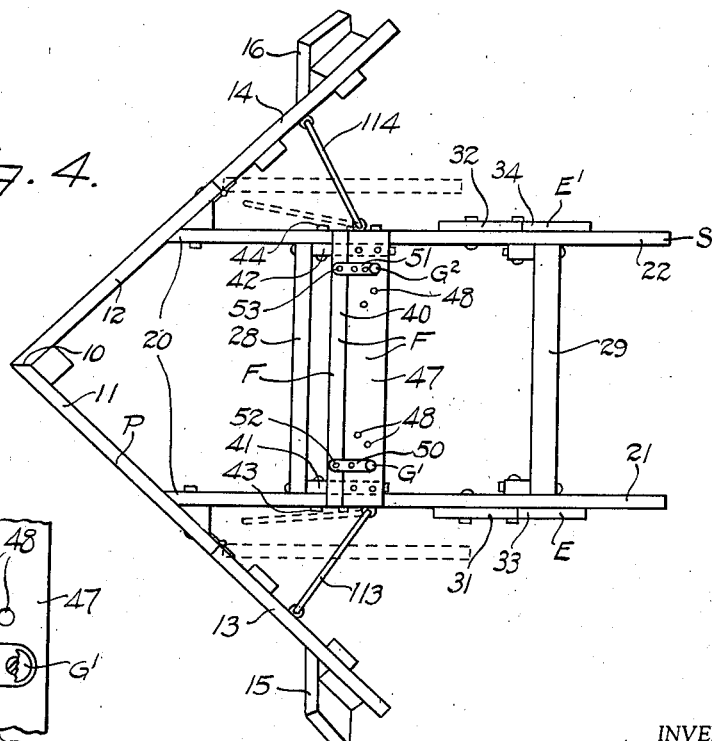
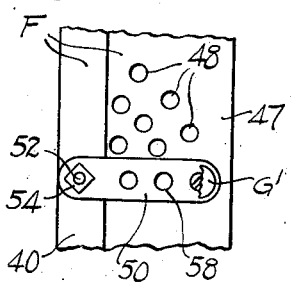
INVENTOR.
Robert E. Gay
BY
Gardner W. Pearson
ATTORNEY.

Dec. 28, 1937. R. E. GAY 2,103,900
AUTOMOBILE SNOW PLOW
Filed Dec. 3, 1935  2 Sheets-Sheet 2
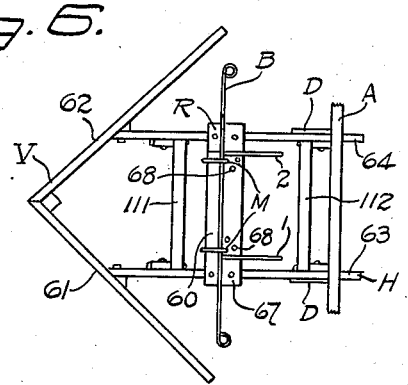
Fig. 6.
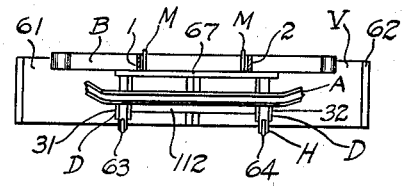
Fig. 7.
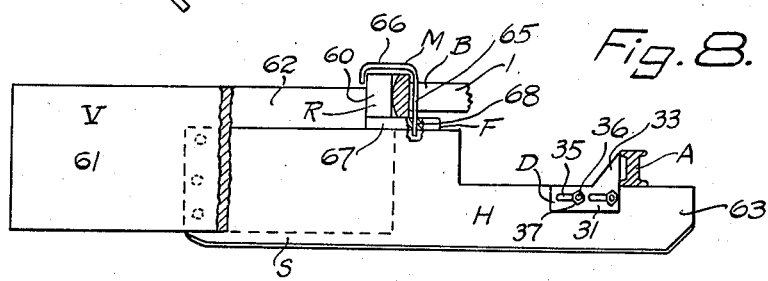
Fig. 8.
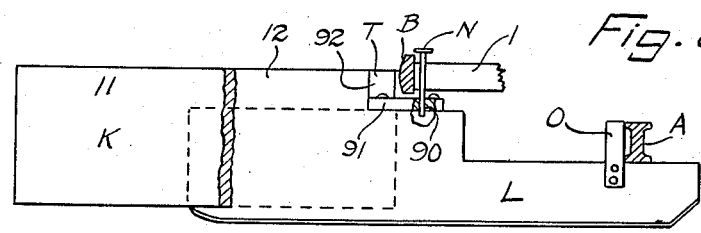
Fig. 9.
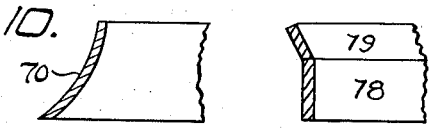
Fig. 10.  Fig. 10-A.
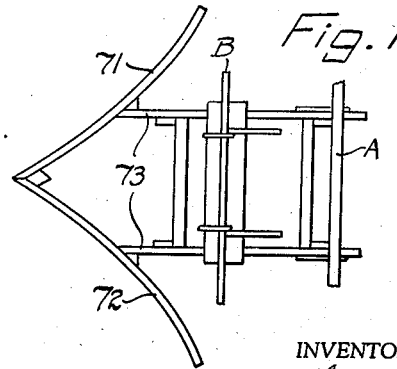
Fig. 11.
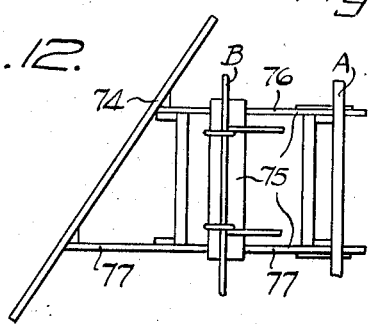
Fig. 12.
INVENTOR.
Robert E. Gay
BY
Gardner W. Pearson
ATTORNEY.

Patented Dec. 28, 1937

2,103,900

UNITED STATES PATENT OFFICE 2,103,900

AUTOMOBILE SNOW PLOW

Robert E. Gay, Tewksbury, Mass.

Application December 3, 1935, Serial No. 52,678

13 Claims. (Cl. 37—44)

This invention relates to snow plows of a type which can be easily and quickly attached to and associated with an automobile, especially of the passenger type, for plowing out driveways and similar ways.

It is of such a type that an automobile with a front axle and particularly with a bumper in front of the axle, can be driven over a sled member carrying a snow moving member of the V type having such devices that the sled and plow can instantly be coupled to the automobile and used to move snow to both sides clear of the wheels of the automobile which, therefore, travels in its own cleared path. The device is so made that it cannot be displaced sideways although it preferably has some looseness of motion both vertically and horizontally, and in the preferred type, can be pulled back when the automobile is backed. It can be as quickly disconnected from the automobile as it is connected.

In the drawings, Fig. 1 is a side elevation showing my snow plow resting on the ground and with an automobile before the two are connected.

Fig. 2 is a side elevation showing the snow plow and automobile connected.

Fig. 3 is an enlarged side elevation of the snow plow detached from the automobile, but showing some parts of the automobile and with one side of the plow partly broken away.

Fig. 4 is a plan view of the plow detached.

Fig. 5 is a plan view showing in detail one method of attaching the plow and automobile.

Fig. 6 is a plan view of a modified type of plow with some parts of the automobile associated with it.

Fig. 7 is a rear view of the plow shown in Fig. 6 with parts of the automobile also shown.

Fig. 8 is a side elevation with parts broken away, similar to Fig. 3, of the plow shown in Figs. 6 and 7.

Fig. 9 is a side elevation similar to Fig. 8, of another modification.

Fig. 10 is a sectional view of a modified shape of a plow side.

Fig. 10A is a sectional view of another modified shape of a plow side.

Fig. 11 is a small sized diagram showing in plan view another type of snow moving member.

Fig. 12 is a diagrammatic plan view of still another type of snow moving member attached to a sled.

In the drawings, C represents part of an automobile which has a front axle A of the usual rigid type and in front of it, a bumper B attached to the body of the automobile C by brackets 1 and 2 of any well-known type. These brackets are usually closer together than the wheels and they, as well as the bumper, may be of any of the usual types now in use.

S is a sled including vertical runners or sides 21 and 22 held together and connected by a front brace 28 and rear brace 29 in any suitable way. The back of these sides or runners 21 and 22 should be of a height to fit easily under the front axle A and a V-shaped plow member P having a nose 10, is carried by and fixed to the front 20 of sled S. This plow member includes the sides 11 and 12 which extend back from the nose 10 and are preferably positioned so that their bottom edges will be perhaps one inch higher than the bottom of runners 21 and 22. In the preferred type, the sides 11 and 12 are extended out beyond the wheels in the form of wings and such wings 13 and 14 may be hinged to the front part of the sides on substantially vertical pivots and may be provided with bracing hooks 113 and 114 by which they may be kept extended, or folded to the runners 21 and 22 of the sled. Obviously the bracing hooks 113 and 114 may be fixed and permanent and the sides and wings may be made integral.

Preferably at the back end of each wing is a guide fin such as 15 or 16 which extends up and away so as to direct the accumulated snow up and away from the path.

3 represents a front wheel carried by axle A. The bumper and axle form part of the chassis.

The sled sides or runners 21 and 22 should rest on the ground Q when connecting the snow plow outfit with an automobile.

Extending up from the rear part of each runner of sled S are axle push members E, E', shown as made of metal with sides 31 and 32 in which are slots such as 35 through which are adjusting bolts such as 36 with suitable nuts 37 by which each axle push member can be adjusted back and forth and held in adjusted position so that the vertical arm of each such as 33 and 34 can be made to rest against the axle A to carry most of the pushing load and so that the bumper B will be in contact with a bumper push member F, also carried by the sled, so as to at least distribute the load.

This bumper push member includes sides 41 and 42 which are movable up and down between runners 21, 22 of the sled and can be adjusted in vertical position by means of holes such as 45, 45 in the sides 41 and 42, and 25, 25 in the runners 21 and 22 by means of bolts such as 43 and 44.

The sides 41 and 42 of member F are held in place by and carry a transverse, vertical cross bar 40, which is to be engaged by the bumper B, and a plate 47 which should be in position under the bumper and which is provided with a plurality of guide pin holes 48.

50 and 51 are flat arms which can be more or less swivelled horizontally on bolts 52 and 53. Each has preferably several guide pin holes such as 58, some one of which should be directly over some of the guide pin holes 48 in the plate 47 so that each guide pin $G^1$ and $G^2$ can be dropped in place through a hole 58 into a hole 48 by turning an arm 50 or 51, as shown in Fig. 5. The arm can then be fixed in position by tightening a nut such as 54.

The purpose of this arrangement is to make the front connections adjustable for bumpers of different heights from the ground and different depths of construction and for different distances between the brackets 1 and 2.

The distance from the plate 47 to these arms should be sufficient to permit the entry of the highest bumpers with the bottom resting on the plate 47 and the purpose of these arms is to allow them to be adjusted so that guide pins $G^1$ and $G^2$ can be dropped through the holes in them into corresponding holes in the plate 47 whereby the position of the pins in the angle between the bumper and the brackets will allow some horizontal play but not enough to do any damage.

The relation of the bumper to the bumper push member is, therefore, such that there is preferably some vertical and horizontal play but the parts can be permanently adjusted for any particular make of automobile. The axle push member can also be adjusted and set so that the axle bumper and plow will all fit and work together.

A simplified construction is shown in Figs. 6, 7 and 8 where V represents the V-shaped snow moving member or snow plow proper, which is similar to P except that its sides 61 and 62 are rigid and without pivoted or hinged wings, and is carried at the front end of a sled H which comprises the sides or runners 63 and 64, held together and braced by braces 111 and 112.

The axle push members D, D are similar to E and are adjustable in the same way, but the bumper push member R, which takes the place of F, is neither vertically nor longitudinally adjustable.

Member R includes the vertical bar 60 against which the bumper presses and which takes the place of 40, and 67 is a horizontal member which goes under the bumper and takes the place of 47.

1 and 2 are the brackets which support and form part of the bumper B and the combined snow plow and sled are loosely connected therewith by means of the curved pins M, M, each of which has a long shank such as 65 and a short shank 66, the long shank being adapted to drop into one of the several holes 68 in the cross member 67, while the short member preferably goes over both bumper B and one of the brackets 1 or 2, as shown in Figs. 6, 7 and 8. This makes a loose but firm and quickly detachable connection between the snow plow and the automobile.

As shown in Fig. 9, the construction can be still more simplified. In Fig. 9, K represents a plow similar to V, and L represents a sled similar to H, while in place of the adjustable axle push bar such as D or E, there is a fixed cross bar O against which axle A presses and instead of curved pins such as M, M, straight pins such as N, N are dropped into holes such as 90 in the bar 91.

Bumper B need not rest on this bottom bar 91 of bumper push member T and it need not engage front bar 92 nor pins N, N, but pins N, N, by engaging a bracket 1 or 2, prevent lateral displacement.

Any type of pin such as G1, G2, M or N prevent lateral displacement, permit quick coupling and uncoupling and allow the plow to be pulled back by the automobile.

The main feature of this invention is a provision of some sort of snow moving member or plow carried at the front of a sled, which sled has runners of such height that they can go under a part of the automobile, such as the front or the rear axle or the front or the rear bumper or both, or under some other part of the chassis, there being at the top of the runners a member against which the axle can push or another member against which the bumper can push, or both can push, there being associated preferably with the bumper push member, some sort of quickly removable or quickly detachable means by which the plow and sled are prevented from slipping out sideways as they are being pushed along.

Obviously in any of the above constructions, the axle push members could be so adjusted as not to touch the axle and the whole pushing could be done by the bumper, the parts being held together by pins or some other means which could be quickly removed. The bumper contacts might be disconnected entirely and all the pushing done by the axle alone, the plow and sled being detachably attached to the axle in some way, but this would not carry out the main feature of my idea, which is a device which can be associated with and connected to an automobile quickly and easily, and in which the stresses and strains are properly distributed.

As shown in Fig. 10, a cross section of either or both sides of a plow can be curved as shown at 70 or as shown in Fig. 11, the sides 71 and 72 may be curved instead of straight, but are attached to a sled 73 as in the other types.

As shown in Fig. 10A, there may be added at the top of a straight side 78 of a plow, an outwardly inclined top board 79 to prevent the snow from running over the top.

As shown in Fig. 12, the snow moving member 74 may be straight instead of in the form of a V and one runner 77 of a sled 75 may be longer than the other runner 76.

I claim:

1. A quick detachable snow plow for automobiles which includes a sled having parallel runners; a V-shaped snow moving member carried at the front of the sled and having hinged wings which extend beyond the sled on both sides and are foldable back towards the sled; bracing hooks to hold the wings away from the sled; axle push members which extend up from the rear part of the sled in position to engage an automobile axle and which are adjustable back and forth on the sled; a vertically adjustable bumper push member extending up from the front of the sled in position to bear against the front of an automobile bumper and having two top guide pin arms, each with a plurality of adjusting holes above other similar holes in the push member; and vertical guide pins, each positioned in two pin holes.

2. A quick detachable snow plow for automobiles which includes a sled having parallel runners; a V-shaped snow moving member carried at the front of the sled and having wings which extend beyond the sled on both sides; axle push members which extend up from the rear part of the sled in position to engage an automobile axle and which are adjustable back and forth on the sled; a vertically adjustable bumper push member extending up from the front of the sled in position to bear against the front of an automobile bumper and having two top guide pin arms, each with a plurality of adjusting holes above other similar holes in the push member; and vertical guide pins, each positioned in two pin holes.

3. A quick detachable snow plow for automobiles which includes a sled having parallel runners; a V-shaped snow moving member carried at the front of the sled and having wings which extend beyond the sled on both sides; axle push members which extend up from the rear part of the sled in position to engage an automobile axle; a bumper push member extending up from the front of the sled in position to bear against the front of an automobile bumper and having a plurality of adjusting holes; and vertical guide pins, each positioned in a pin hole.

4. A quick detachable snow plow for automobiles which includes a sled having parallel runners; a V-shaped snow moving member carried at the front of the sled and having wings which extend beyond the sled on both sides; axle push members which extend up from the rear part of the sled in position to engage an automobile axle; a bumper push member extending up from the front of the sled in position to bear against the front of an automobile bumper and having a plurality of adjusting holes; and vertical guide pins, each positioned in a pin hole and each having at the top a bent over part to hook over an automobile bumper or bracket.

5. A quick detachable snow plow for automobiles which includes a sled having parallel runners; a V-shaped snow moving member carried at the front of the sled and having wings which extend beyond the sled on both sides; axle push members which extend up from the rear part of the sled in position to engage an automobile axle; a bumper push member extending up from the front of the sled in position to bear against the front of an automobile bumper and having a plurality of adjusting holes; and vertical guide pins, each positioned in a pin hole to engage the back of an automobile bumper.

6. A quick detachable snow plow for automobiles which includes a sled having parallel runners; a V-shaped snow moving member carried at the front of the sled; axle push members which extend up from the rear part of the sled in position to engage an automobile axle; a bumper push member extending up from the front of the sled in position to bear against the front of an automobile bumper and having a plurality of adjusting holes; and vertical guide pins, each positioned in a pin hole to engage the back of an automobile bumper.

7. The combination with an automobile having a fixed axle and a bumper spaced therefrom; of a detachable snow plow including V-shaped snow moving members all of which are entirely supported away from the ground by a sled which sled includes parallel runners which extend under the axle, a member of the sled which extends up and bears against the axle and another part which is so connected to the bumper as to allow vertical and limited side movement but keeps the snow moving members in front of the bumper and axle.

8. The combination with an automobile having a fixed axle and a bumper spaced therefrom; of a detachable snow plow including V-shaped snow moving members all of which are entirely supported away from the ground by a sled which sled includes parallel runners which extend under the axle, a member of the sled which extends up and bears against the axle and another member of the sled which extends upon and bears against the bumper.

9. The combination with an automobile having a fixed axle; of a quick detachable snow plow including V-shaped snow moving members all of which are entirely supported away from the ground by a sled which sled includes parallel runners which extend under the axle, a member of the sled which extends up and bears against the axle and another member of the sled which is detachably connected to another part of the automobile by means which includes a guide pin, the removal of which permits the snow plow to be detached.

10. A quick detachable snow plow for automobiles which includes a sled having parallel runners; a snow moving member rigidly carried and supported at the front of and carried by the sled; an axle push member which extends up from the rear part of the sled in position to engage an automobile axle; a bumper push member extending up from the front of the sled in position to bear against the front of an automobile bumper; and quick operable detaching means associated with the bumper push member to limit the lateral displacement of the plow and sled.

11. A quick detachable snow plow for automobiles which includes a snow moving member rigidly carried by a sled which includes two parallel runners which entirely support all parts of the snow moving member away from the ground and which runners are of such length that the rear part of them can extend under an automobile, there being an axle push member which extends up from the rear part of the sled in such manner that it will have two points of contact with an automobile axle; and a bumper push member which extends up from the sled in front of the axle push member in position to bear against the front of an automobile bumper; and quick operable detaching means associated with the bumper push member to limit the lateral displacement of the plow and of the sled.

12. The combination with an automobile having a fixed axle and a bumper spaced therefrom; of a detachable snow plow including V-shaped snow moving members all of which are entirely supported away from the ground by a sled which sled includes parallel runners which extend under the axle, a member of the sled which extends up and bears against the axle and another part which is so connected to the bumper as to allow vertical and limited side movement but keeps the snow moving members in front of the bumper and axle, the bottom part of the snow moving members sloping forward.

13. A quick detachable snow plow for automobiles which includes a snow moving member rigidly carried by a sled which includes two parallel runners which entirely support all parts of the snow moving member away from the ground and which runners are of such length that the rear part of them can extend under an automobile, there being an axle push member which extends up from the rear part of the sled in such manner that it will have a point of contact with an automobile axle; and a bumper push member which extends up from the sled in front of the axle push member in position to engage an automobile bumper; and quick operable detaching means associated with the bumper push member to limit the lateral displacement of the plow and of the sled.

ROBERT E. GAY.